(12) United States Patent
Liu et al.

(10) Patent No.: US 11,942,717 B2
(45) Date of Patent: Mar. 26, 2024

(54) CONNECTION PORT MODULE

(71) Applicants: Han-Tsai Liu, Taipei (TW);
Jyh-Chyang Tzou, Taipei (TW);
Ting-Hsuan Yu, Taipei (TW)

(72) Inventors: Han-Tsai Liu, Taipei (TW);
Jyh-Chyang Tzou, Taipei (TW);
Ting-Hsuan Yu, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 33 days.

(21) Appl. No.: 17/516,673

(22) Filed: Nov. 1, 2021

(65) Prior Publication Data
US 2022/0393388 A1    Dec. 8, 2022

Related U.S. Application Data

(60) Provisional application No. 63/197,517, filed on Jun. 7, 2021.

(51) Int. Cl.
*H01R 13/516* (2006.01)
*H01R 13/6581* (2011.01)
(Continued)

(52) U.S. Cl.
CPC ....... *H01R 13/516* (2013.01); *H01R 13/6581* (2013.01); *H01R 12/7005* (2013.01); *H01R 13/518* (2013.01); *H01R 33/975* (2013.01)

(58) Field of Classification Search
CPC .......... H01R 33/975; H01R 12/7005; H01R 13/516; H01R 13/6581; H01R 13/518
See application file for complete search history.

(56) References Cited

U.S. PATENT DOCUMENTS 9,722,346 B1 * 8/2017 McWethy .......... H01R 13/4538
2015/0099385 A1 * 4/2015 Ikeya ................ H01R 12/7005
439/271
(Continued)

FOREIGN PATENT DOCUMENTS

CN    114498200 A  *  5/2022  .......... H01R 12/724
TW    I407641         9/2013
(Continued)

OTHER PUBLICATIONS

"Office Action of Taiwan Counterpart Application", dated Mar. 20, 2023, p. 1-p. 13.

*Primary Examiner* — Abdullah A Riyami
*Assistant Examiner* — Justin M Kratt
(74) *Attorney, Agent, or Firm* — JCIPRNET (57) ABSTRACT

A connection port module includes a fixed frame and a connection port. The fixed frame includes a main body portion, a first holding portion, and a second holding portion. The first holding portion is connected to one side of the main body portion and includes a first holding surface. The second holding portion is connected to the other side of the main body portion and includes a second holding surface. The first holding surface faces the second holding surface. The connection port is disposed in the fixed frame, and is located between the first holding surface and the second holding surface. A connector is adapted to be inserted into the connection port. The first holding surface and the second holding surface are adapted to abut against the connector to fix the connector on the fixed frame.

14 Claims, 11 Drawing Sheets

(51) Int. Cl.
    *H01R 12/70*     (2011.01)
    *H01R 13/518*    (2006.01)
    *H01R 33/975*    (2006.01)

(56) References Cited

U.S. PATENT DOCUMENTS

2017/0222374 A1* 8/2017 Saito .................. H01R 24/64
2019/0363495 A1* 11/2019 Ju .................... H01R 13/6594

FOREIGN PATENT DOCUMENTS

| TW | I407641 | B  | * | 9/2013 |
| TW | I407641 | B1 | * | 9/2013 |
| TW | M505094 |    |   | 7/2015 |

* cited by examiner

CONNECTION PORT MODULE

CROSS-REFERENCE TO RELATED APPLICATION

This application claims the priority benefit of U.S. provisional application Ser. No. 63/197,517, filed on Jun. 7, 2021. The entirety of the above-mentioned patent application is hereby incorporated by reference herein and made a part of this specification.

BACKGROUND

Technical Field

The disclosure relates to a connection port module. Particularly, the disclosure relates to a connection port module applicable to portable electronic devices.

Description of Related Art

Portable electronic devices, such as smart phones, tablet computers, or notebook computers, have been widely used in daily life. For whichever of the various kinds of portable electronic devices, there is a need for data transmission or charging. Therefore, the current portable electronic devices are generally designed with a connection port module, which is configured for connection to an external connector and serves for data transmission or charging.

Generally, in the connection port module, four side walls surround a central connection port on the outside to fix the external connector. However, the connection port module in this form has a relatively large overall thickness, which further affects the thickness of the portable electronic device. As such, the existing connection port is not conducive to a trend toward the thinned design of portable electronic devices.

SUMMARY

The disclosure provides a connection port module that not only is capable of firmly fixing an external connector, but also has a relatively small thickness.

A connection port module of the disclosure includes a fixed frame and a connection port. The fixed frame includes a main body portion, a first holding portion, and a second holding portion. The first holding portion is connected to one side of the main body portion, and the first holding portion includes a first holding surface. The second holding portion is connected to the other side of the main body portion, and the second holding portion includes a second holding surface. The first holding surface faces the second holding surface. The connection port is disposed in the fixed frame, and the connection port is located between the first holding surface and the second holding surface. A connector is adapted to be inserted into the connection port. The first holding surface and the second holding surface are adapted to abut against the connector to fix the connector on the fixed frame.

In an embodiment of the disclosure, the fixed frame exposes opposite surfaces of the connection port.

In an embodiment of the disclosure, the fixed frame includes a notch. The notch is located between the first holding portion and the second holding portion. The connection port is located in the notch. The notch exposes opposite surfaces of the connection port.

In an embodiment of the disclosure, the first holding surface and the second holding surface are adapted to abut against four corners of the connector.

In an embodiment of the disclosure, the connection port is connected to the fixed frame by assembly or the connection port is integrally connected to the fixed frame.

In an embodiment of the disclosure, the first holding surface and the second holding surface are each a curved surface. Four corners of the connector are each a curved surface. The four corners of the connector are adapted to abut against the curved surface of the first holding surface and the curved surface of the second holding surface.

In an embodiment of the disclosure, when a curvature of the first holding surface and the second holding surface are the same as a curvature of the four corners of the connector, projections of centers of circle of the first holding surface and the second holding surface and projections of corresponding centers of circle of the four corners on a virtual plane are overlapped with each other. When the curvature of the first holding surface and the curvature of the second holding surface are greater or less than the curvatures of the four corners of the connector, the projections of the centers of circle of the first holding surface and the second holding surface and the projections of the corresponding centers of circle of the four corners on the virtual plane are non-overlapped with each other.

In an embodiment of the disclosure, the first holding surface and the second holding surface each include a concave-convex structure.

In an embodiment of the disclosure, the first holding surface and the second holding surface each include a planar region and two inclined regions. The two inclined regions are located on opposite sides of the planar region. The two inclined regions of the first holding surface and the two inclined regions of the second holding surface are adapted to abut against four corners of the connector.

In an embodiment of the disclosure, the first holding surface and the second holding surface each include a planar region and two curved regions protruding toward the main body portion. The two curved regions are located on opposite sides of the planar region. The two curved regions of the first holding surface and the two curved regions of the second holding surface are adapted to abut against four corners of the connector.

In an embodiment of the disclosure, the fixed frame includes an insertion inlet opposite to the main body portion. A shortest distance between the first holding surface and the second holding surface is gradually reduced from the insertion inlet toward the main body portion.

In an embodiment of the disclosure, the connection port module further includes a plurality of fixed engagement protrusions. The fixed engagement protrusions are respectively disposed on the first holding portion and the second holding portion. The fixed engagement protrusions respectively protrude from the first holding portion and the second holding portion.

In an embodiment of the disclosure, the connection port module further includes a plurality of first conductive members and a plurality of second conductive members. The first conductive members are connected to the connection port. The second conductive members are respectively disposed on and pass through the first holding portion and the second holding portion. The second conductive members are connected to the first conductive members.

In an embodiment of the disclosure, the second conductive members disposed on the first holding portion protrude from or are flush with a first outer surface of the first holding portion. The second conductive members disposed on the second holding portion protrude from or are flush with a second outer surface of the second holding portion.

In an embodiment of the disclosure, each of the second conductive members includes a front end and a rear end opposite to the front end. The front end disposed on the first holding portion passes through and protrudes from the first holding surface. The front end disposed on the second holding portion passes through and protrudes from the second holding surface. The rear end disposed on the first holding portion and the rear end disposed on the second holding portion pass through the fixed frame and are connected to the first conductive members.

Based on the foregoing, in the connection port module of the disclosure, the fixed frame includes the main body portion, the first holding portion, and the second holding portion. The first holding portion and the second holding portion are respectively connected to opposite sides of the main body portion. The first holding portion includes the first holding surface. The second holding portion includes the second holding surface. The first holding surface faces the second holding surface. The connection port is disposed in the fixed frame, and is located between the first holding surface and the second holding surface. A connector is adapted to be inserted into the connection port. The first holding surface and the second holding surface are adapted to abut against the connector to fix the connector on the fixed frame. Accordingly, in the connection port module, since the connector can be fixed through the first holding portion and the second holding portion located on the opposite sides of the main body portion, it is possible to not only firmly fix the external connector, but also achieve a relatively small thickness at the same time, helping the thinning of the portable electronic device to which the connection port module is applied.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
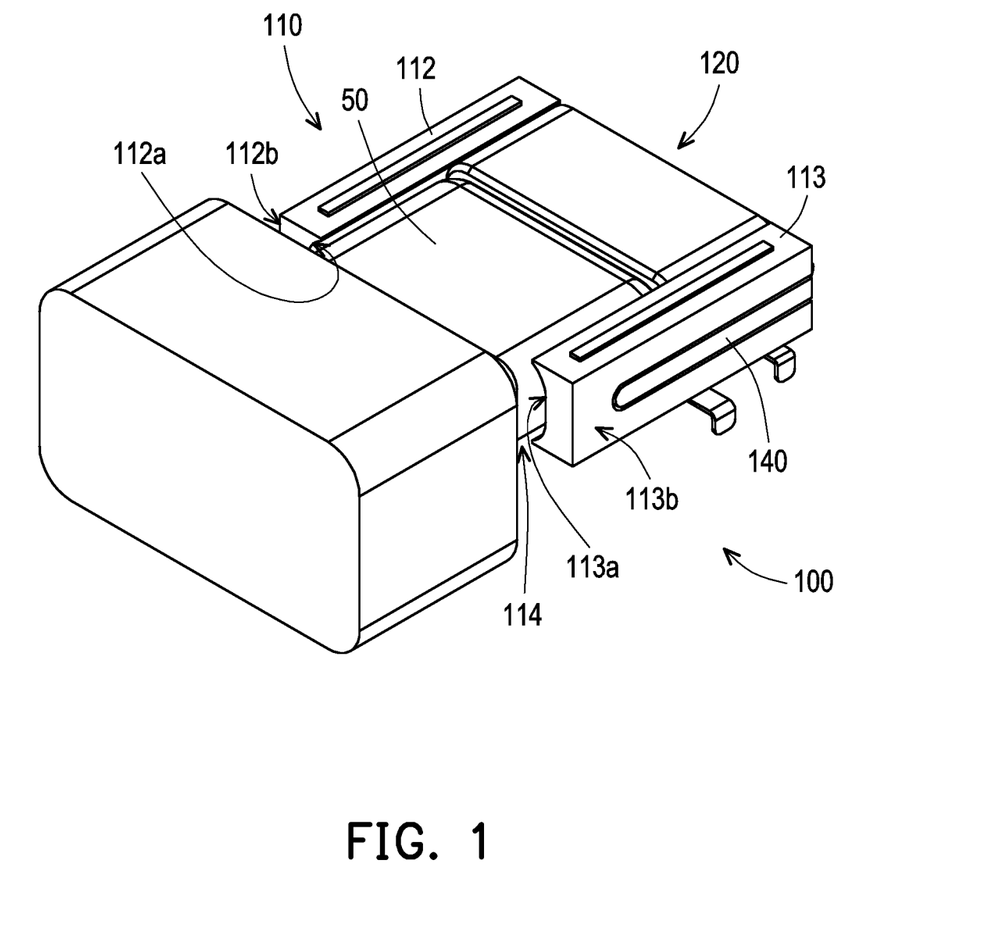
FIG. 1 is a schematic perspective view of a connection port module according to a first embodiment of the disclosure.
Figure 2:
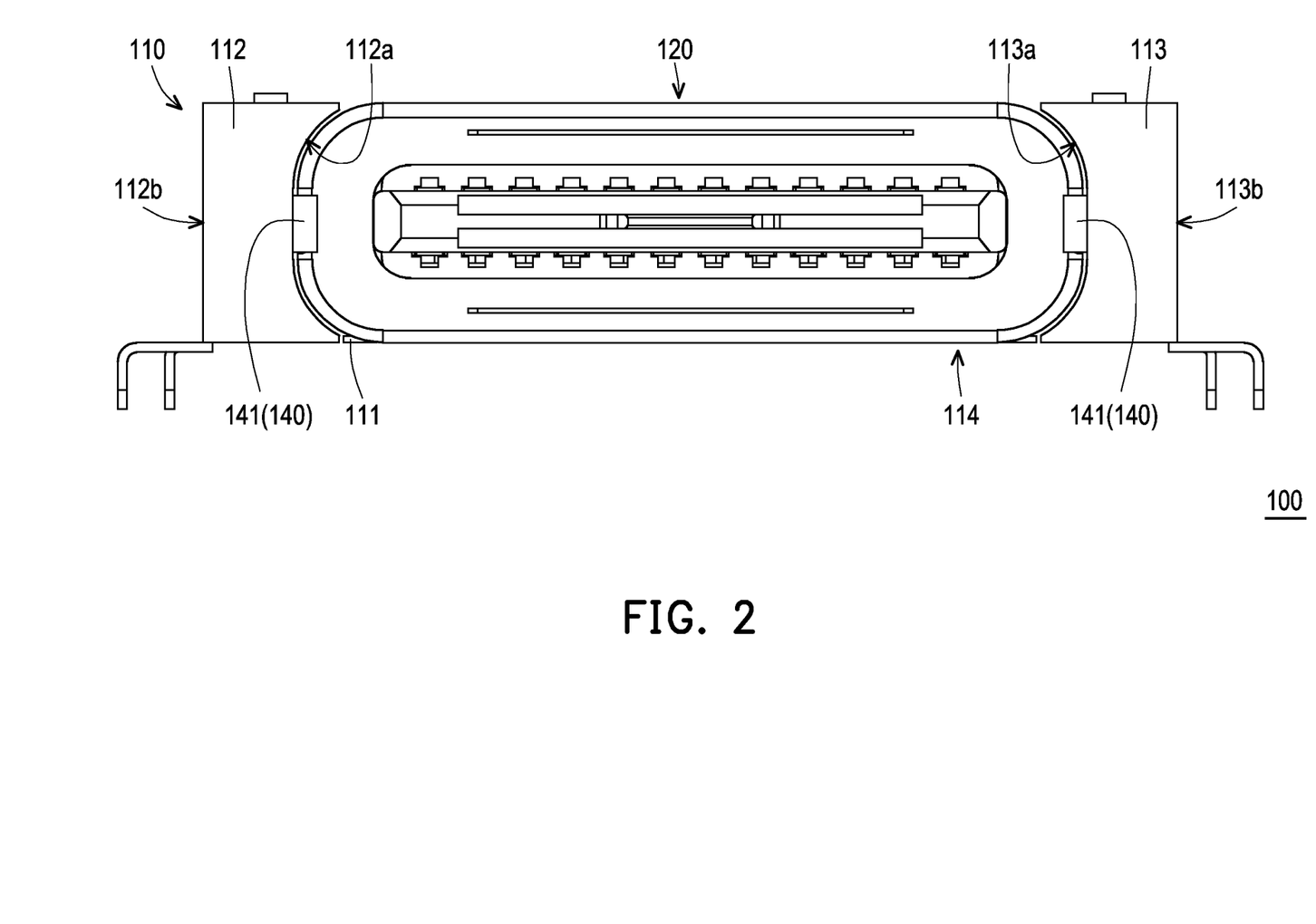
FIG. 2 is a front view of the connection port module of FIG. 1.
Figure 3:
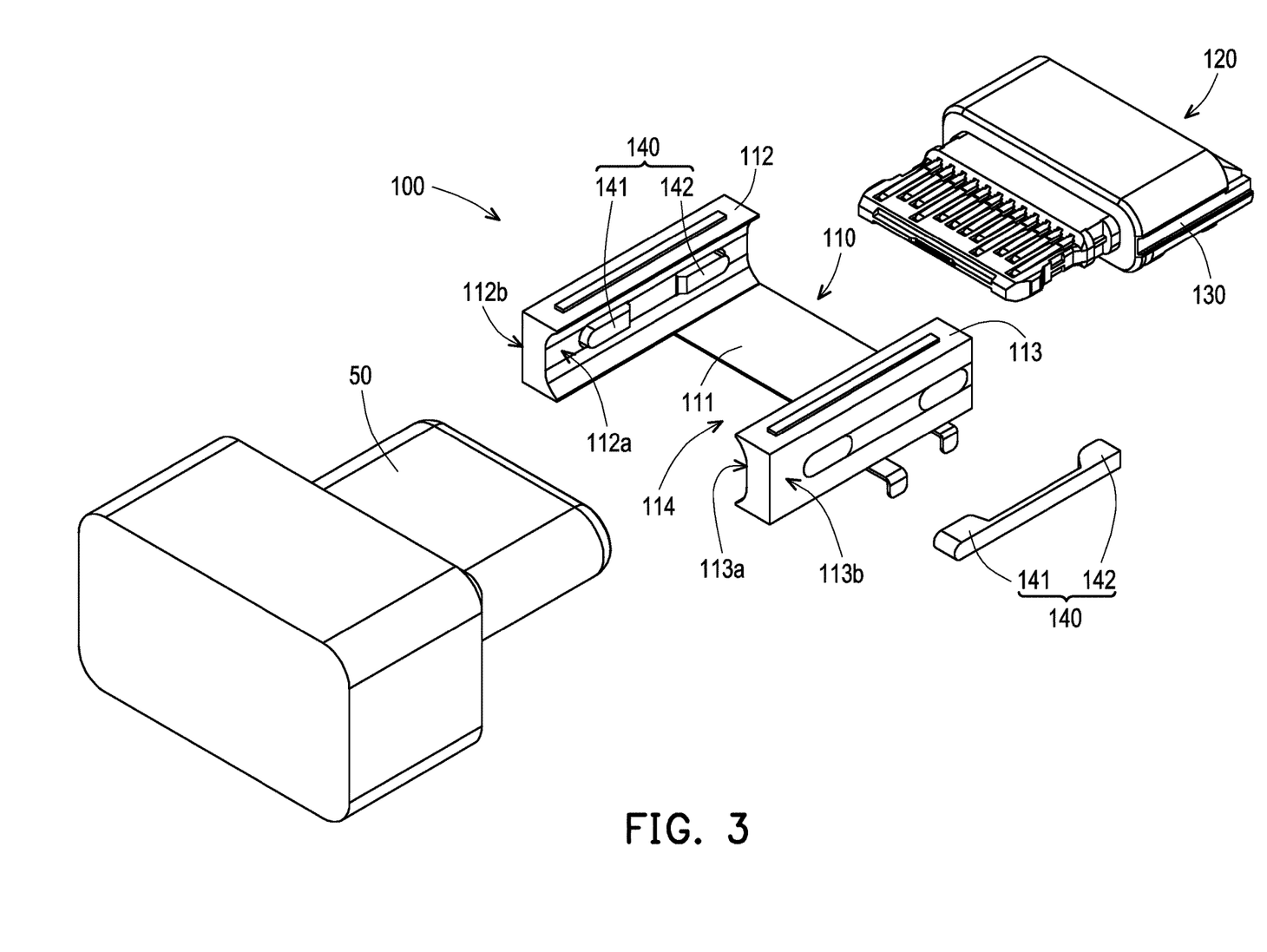
FIG. 3 is an exploded view of the connection port module of FIG. 1.

FIG. 1 is a schematic perspective view of a connection port module according to a first embodiment of the disclosure. FIG. 2 is a front view of the connection port module of FIG. 1. FIG. 3 is an exploded view of the connection port module of FIG. 1. With reference to FIG. 1, FIG. 2, and FIG. 3, a connection port module 100 of this embodiment is configured to be mounted on portable electronic devices such as smart phones, tablet computers, or notebook computers. The connection port module 100 includes a fixed frame 110 and a connection port 120. The connection port 120 is connected to the fixed frame 110, for example, by assembly. In other words, the connection port 120 and the fixed frame 110 are a two-piece structure, and the connection port 120 is adapted to be assembled on the fixed frame 110. In other embodiments, the connection port is integrally connected to the fixed frame. In other words, the connection port and the fixed frame are an integrally formed one-piece.

In this embodiment, the fixed frame 110 includes a main body portion 111, a first holding portion 112, a second holding portion 113, and a notch 114. The first holding portion 112 is connected to one side of the main body portion 111, and the second holding portion 113 is connected to the other side of the main body portion 111. In other words, the first holding portion 112 and the second holding portion 113 are respectively connected to opposite sides of the main body portion 111. The first holding portion 112 includes a first holding surface 112a, the second holding portion 113 includes a second holding surface 113a, and the first holding surface 112a faces the second holding surface 113a. The notch 114 is located between the first holding surface 112a of the first holding portion 112 and the second holding surface 113a of the second holding portion 113.

The connection port 120 is disposed in the fixed frame 110 and located in the notch 114, and the connection port 120 is located between the first holding surface 112a and the second holding surface 113a, such that the notch 114 of the fixed frame 110 exposes opposite surfaces of the connection port 120. An external connector 50 is adapted to be inserted into the connection port 120. In addition, when the connector 50 is inserted into the connection port 120, the first holding surface 112a and the second holding surface 113a are adapted to abut against opposite sides of the connector 50 to fix the connector 50 on the fixed frame 110.

Accordingly, in the connection port module 100, since the connector 50 can be fixed through the first holding portion 112 and the second holding portion 113 located on the opposite sides of the main body portion 111, it is possible to not only firmly fix the external connector 50, but also achieve a relatively small thickness at the same time, helping the thinning of the portable electronic device to which the connection port module 100 is applied.

Figure 4A:
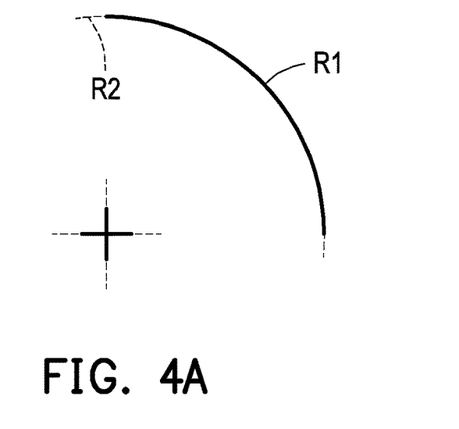
FIG. 4A, FIG. 4B, and FIG. 4C are schematic views showing engagement of the connection port module of FIG. 1.
Figure 4B:
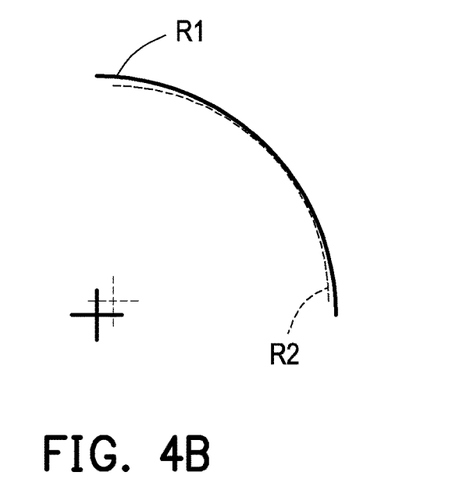
Figure 4C:
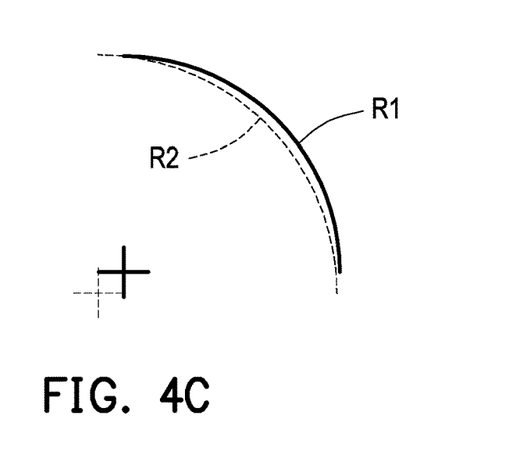

FIG. 4A, FIG. 4B, and FIG. 4C are schematic views showing engagement of the connection port module of FIG. 1. With reference to FIG. 1, FIG. 4A, FIG. 4B, and FIG. 4C, the first holding surface 112a and the second holding surface 113a are adapted to abut against four corners of the connector 50.

In this embodiment, the first holding surface 112a and the second holding surface 113a are each a curved surface. The four corners of the connector 50 are each a curved surface. In addition, the four corners of the connector 50 are adapted to abut against the curved surface of the first holding surface 112a and the curved surface of the second holding surface 113a.

When a curvature R1 of the first holding surface 112a and the second holding surface 113a is the same as a curvature R2 of the four corners of the connector 50 as shown in FIG. 4A, projections of centers of circle of the first holding surface 112a and the second holding surface 113a and projections of corresponding centers of circles of the four corners of the connector 50 on a virtual plane are overlapped with each other.

When the curvature R1 of the first holding surface 112a and the second holding surface 113a is greater than the curvature R2 of the four corners of the connector 50 as shown in FIG. 4B or is less than the curvature R2 of the four corners of the connector 50 as shown in FIG. 4C, projections of the centers of circle of the first holding surface 112a and the second holding surface 113a and the projections of the corresponding centers of circle of the four corners on the virtual plane are non-overlapped with each other.

With reference to FIG. 1, FIG. 2, and FIG. 3, the connection port module 100 further includes a plurality of first conductive members 130 and a plurality of second conductive members 140. The first conductive members 130 are connected to the connection port 120. The second conductive members 140 are respectively disposed on and pass through the first holding portion 112 and the second holding portion 113. The second conductive members 140 are connected to the first conductive members 130, such that the connection port 120 is electrically connected to the portable electronic device to which the connection port 120 is applied through the first conductive members 130 and the second conductive members 140.

In this embodiment, the second conductive members 140 disposed on the first holding portion 112 are flush with a first outer surface 112b of the first holding portion 112, and the second conductive members 140 disposed on the second holding portion 113 are flush with a second outer surface 113b of the second holding portion 113.

In other embodiments, the second conductive members disposed on the first holding portion protrude from the first outer surface of the first holding portion, and the second conductive members disposed on the second holding portion protrude from the second outer surface of the second holding portion.

In this embodiment, each second conductive member 140 includes a front end 141 and a rear end 142 opposite to the front end 141. The front end 141 disposed on the first holding portion 112 passes through and protrudes from the first holding surface 112a, and the front end 141 disposed on the second holding portion 113 passes through and protrudes from the second holding surface 113a. The rear end 142 disposed on the first holding portion 112 and the rear end 142 disposed on the second holding portion 113 pass through the fixed frame 110 and are connected to the first conductive members 130.

Figure 5:
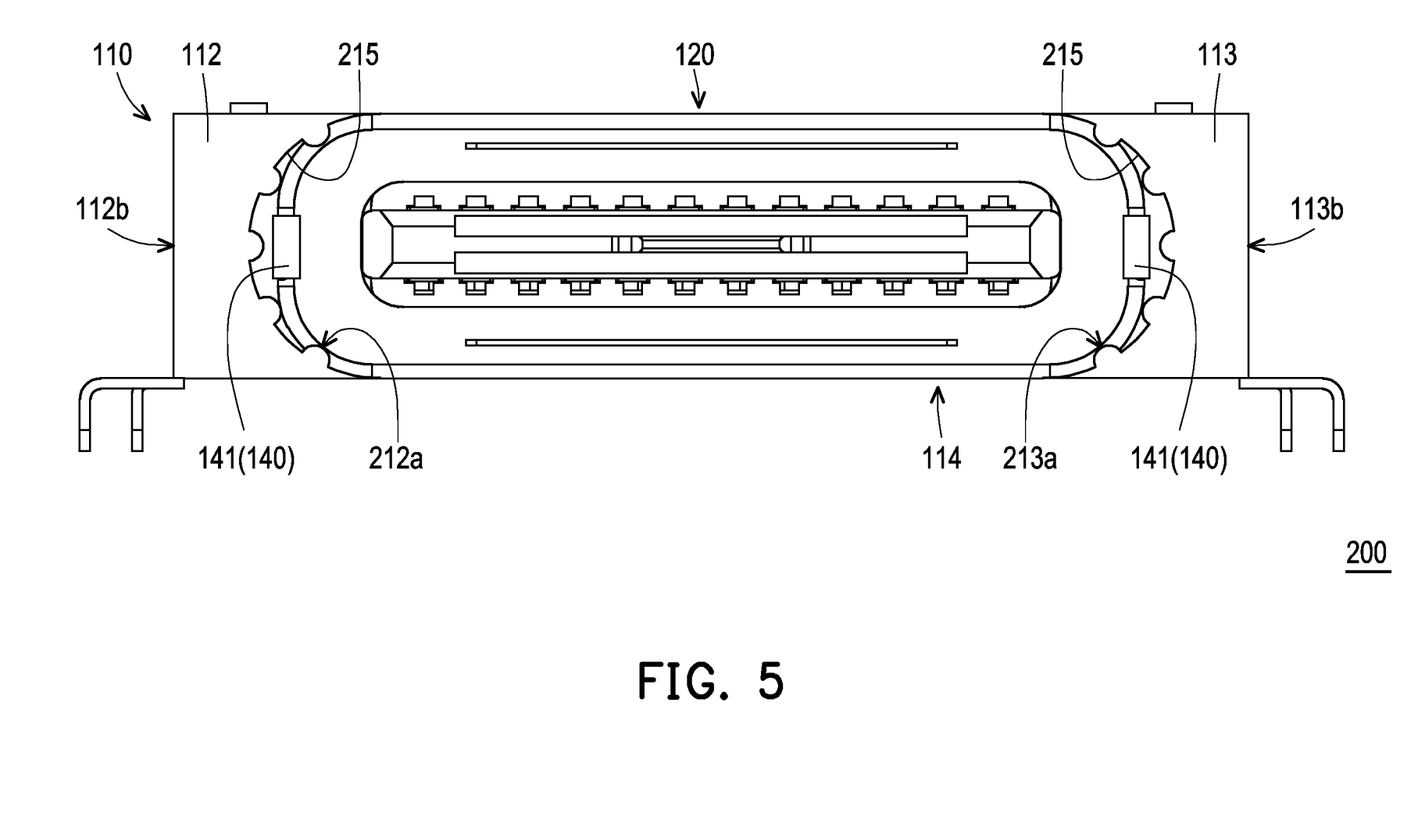
FIG. 5 is a schematic view of a connection port module according to a second embodiment of the disclosure.
Figure 6A:
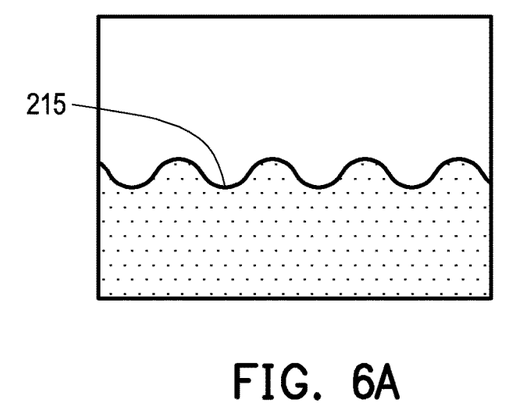
FIG. 6A, FIG. 6B, and FIG. 6C are schematic views of a concave-convex structure according to other embodiments of the disclosure.
Figure 6B:
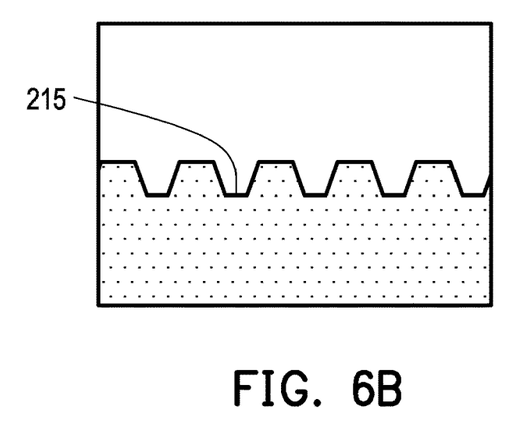
Figure 6C:
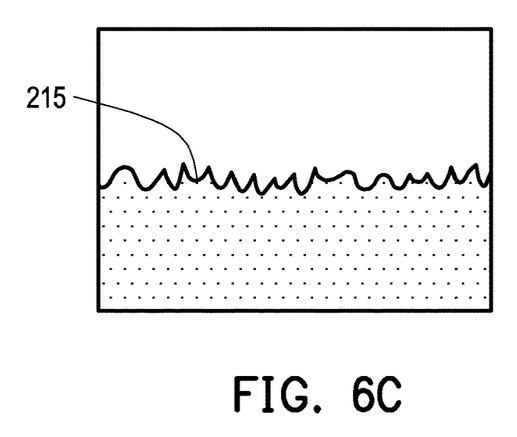

FIG. 5 is a schematic view of a connection port module according to a second embodiment of the disclosure. FIG. 6A, FIG. 6B, and FIG. 6C are schematic views of a concave-convex structure according to other embodiments of the disclosure. With reference to FIG. 5, in a connection port module 200 of FIG. 5, a first holding surface 212a and a second holding surface 213a each include a concave-convex structure 215. FIG. 6A, FIG. 6B, and FIG. 6C show the concave-convex structures 215 of other embodiments.

Figure 7:
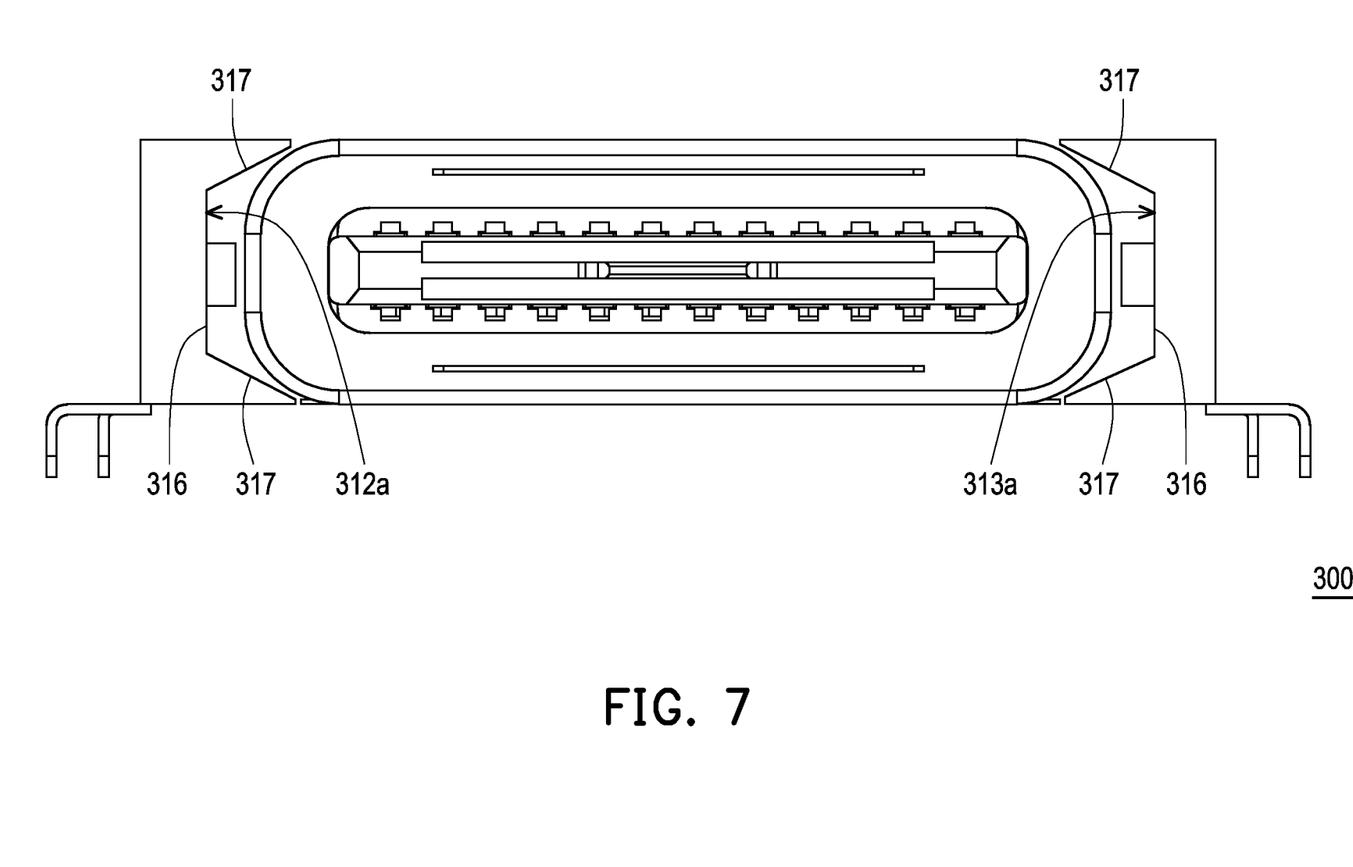
FIG. 7 is a schematic view of a connection port module according to a third embodiment of the disclosure.

FIG. 7 is a schematic view of a connection port module according to a third embodiment of the disclosure. With reference to FIG. 7, in a connection port module 300 of this embodiment, a first holding surface 312a and a second holding surface 313a each include a planar region 316 and two inclined regions 317. The two inclined regions 317 are located on opposite sides of the corresponding planar region 316. The two inclined regions 317 of the first holding surface 312a and the two inclined regions 317 of the second holding surface 313a are adapted to abut against four corners of a connector.

Figure 8:
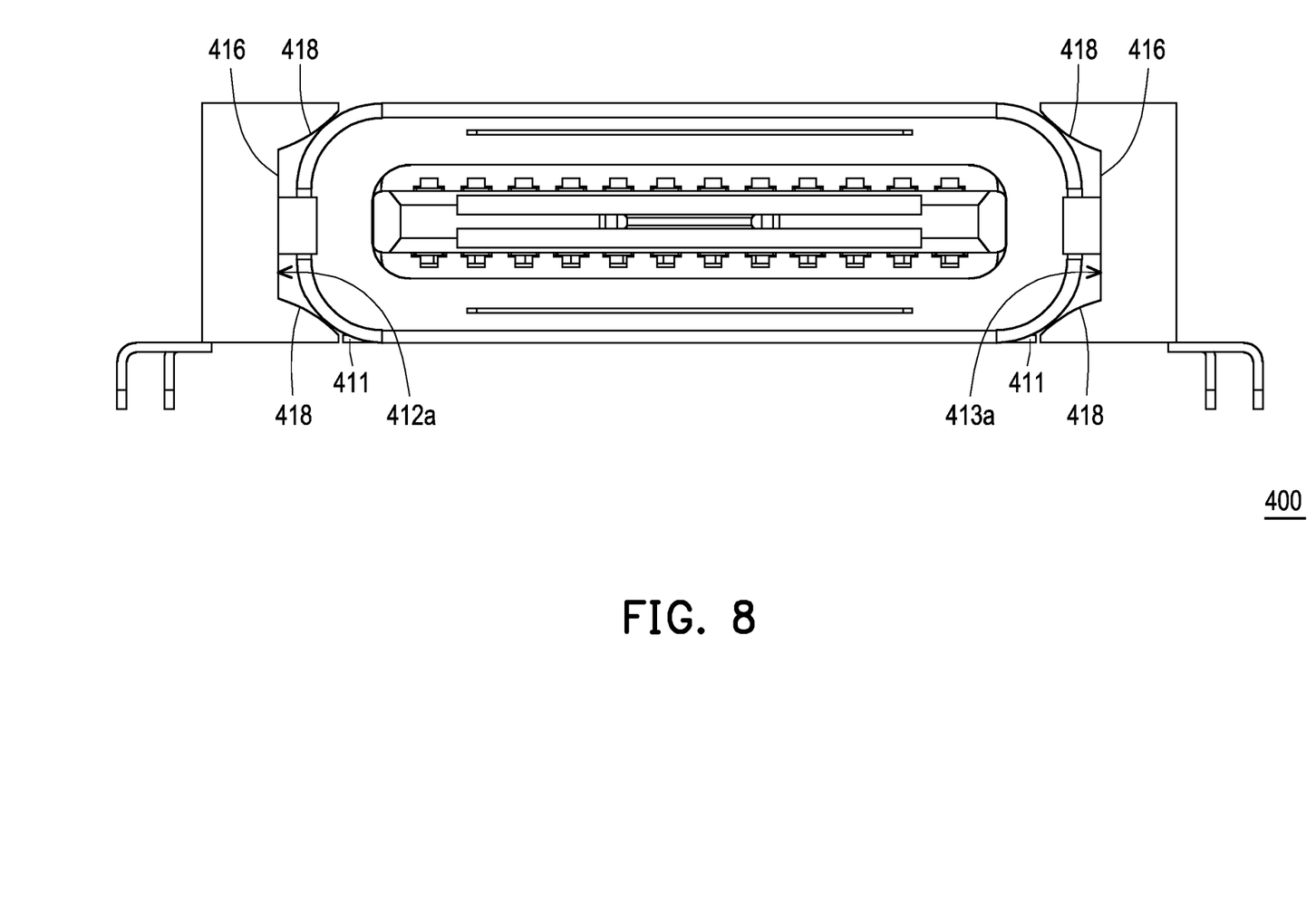
FIG. 8 is a schematic view of a connection port module according to a fourth embodiment of the disclosure.

FIG. 8 is a schematic view of a connection port module according to a fourth embodiment of the disclosure. With reference to FIG. 8, in a connection port module 400 of this embodiment, a first holding surface 412a and a second holding surface 413a each include a planar region 416 and two curved regions 418 protruding toward a main body portion 411. The two curved regions 418 are located on opposite sides of the planar region 416. The two curved regions 418 of the first holding surface 412a and the two curved regions 418 of the second holding surface 413a are adapted to abut against four corners of a connector.

Figure 9:
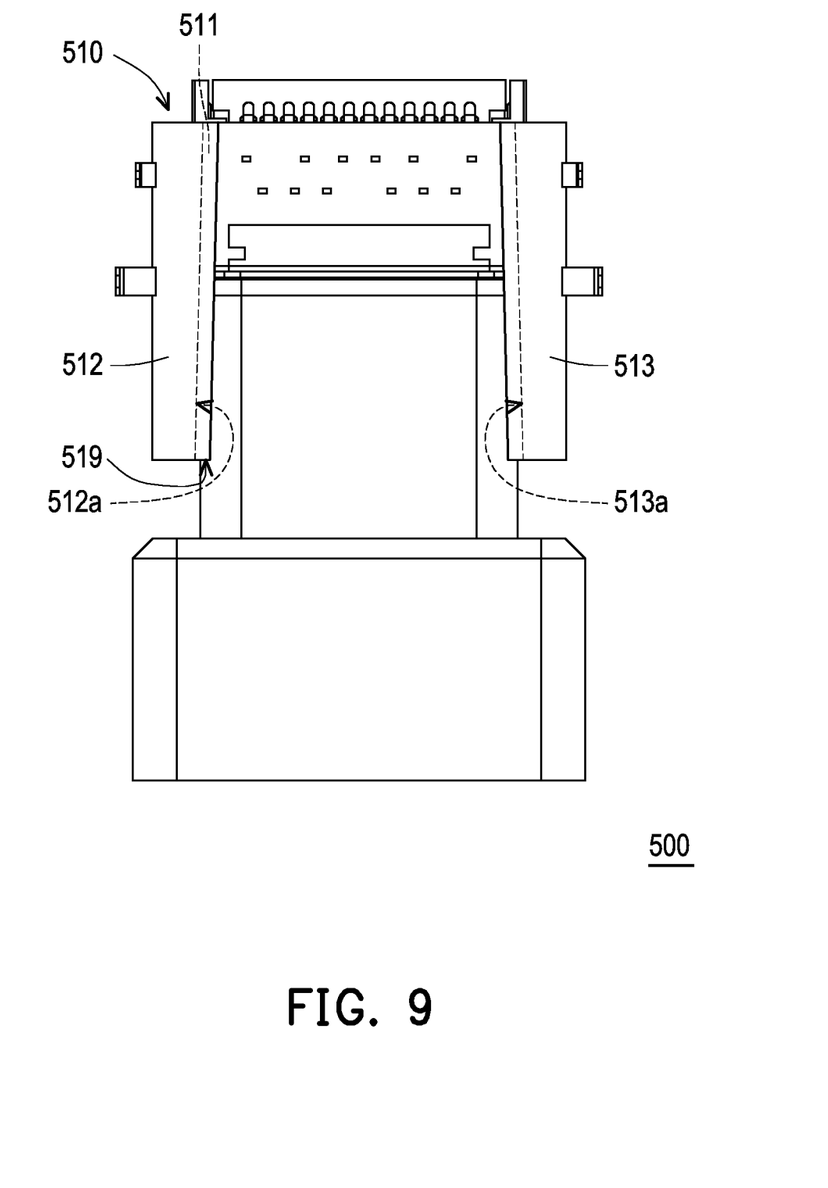
FIG. 9 is a schematic view of a connection port module according to a fifth embodiment of the disclosure.

FIG. 9 is a schematic view of a connection port module according to a fifth embodiment of the disclosure. With reference to FIG. 9, in a connection port module 500 of this embodiment, a fixed frame 510 includes an insertion inlet 519 opposite to a main body portion 511. The shortest distance between a first holding surface 512a and a second holding surface 513a is gradually reduced from the insertion inlet 519 toward the main body portion 511. Accordingly, as the connector 50 is inserted into the connection port module 500, a first holding portion 512 and a second holding portion 513 provide a gradually increased clamping force. In other words, as shown in FIG. 9, the shortest distance between the first holding surface and the second holding surface of the embodiments shown in FIG. 2, FIG. 5, FIG. 7, and FIG. 8 may also be gradually reduced from the insertion inlet toward the main body portion.

Figure 10A:
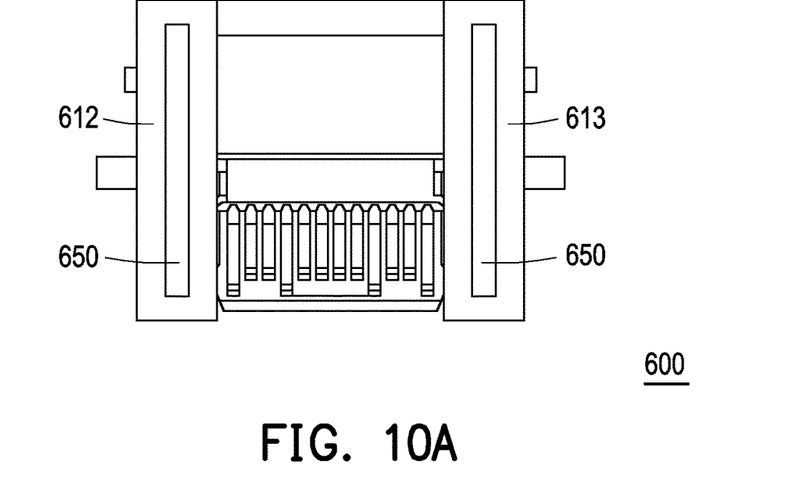
FIG. 10A and FIG. 10B are schematic views of a connection port module according to a sixth embodiment of the disclosure.
Figure 10B:
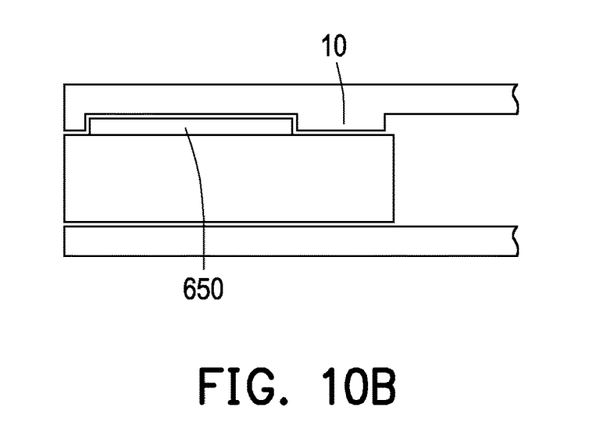

FIG. 10A and FIG. 10B are schematic views of a connection port module according to a sixth embodiment of the disclosure. With reference to FIG. 10A and FIG. 10B, a connection port module 600 further includes a plurality of fixed engagement protrusions 650 to reinforce the structural strength of the assembly of the connection port module 600 to the portable electronic device 10, thereby preventing the connection port module 600 from falling or being detached from the portable electronic device 10 on which the connection port module 600 is mounted because of multiple times of insertions and removals of the connector. The fixed engagement protrusions 650 are respectively disposed on a first holding portion 612 and a second holding portion 613, and the fixed engagement protrusions 650 respectively protrude from the first holding portion 612 and the second holding portion 613. In particular, FIG. 10B schematically shows the fixed engagement protrusion 650 on a single upper side, but the position and quantity of the fixed engagement protrusions 650 are not limited by the disclosure, but should be determined as required. In other embodiments, the fixed engagement protrusion 650 may only be disposed on a single lower side. In other embodiments, the fixed engagement protrusion 650 may be disposed on both the upper and lower sides at the same time.

Figure 11:
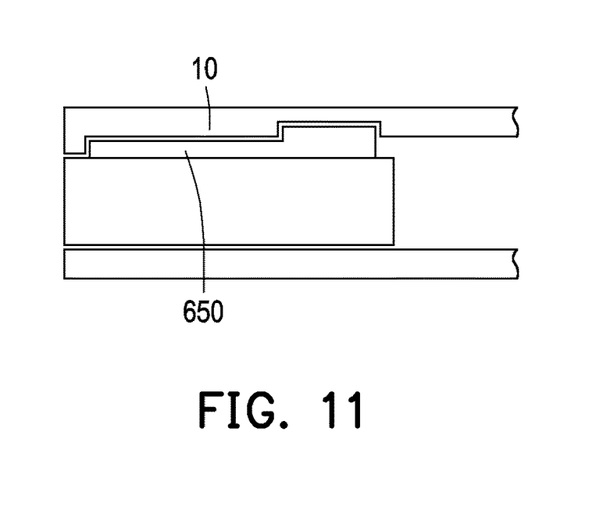
FIG. 11 is a schematic view of a connection port module according to a seventh embodiment of the disclosure.
Figure 12A:
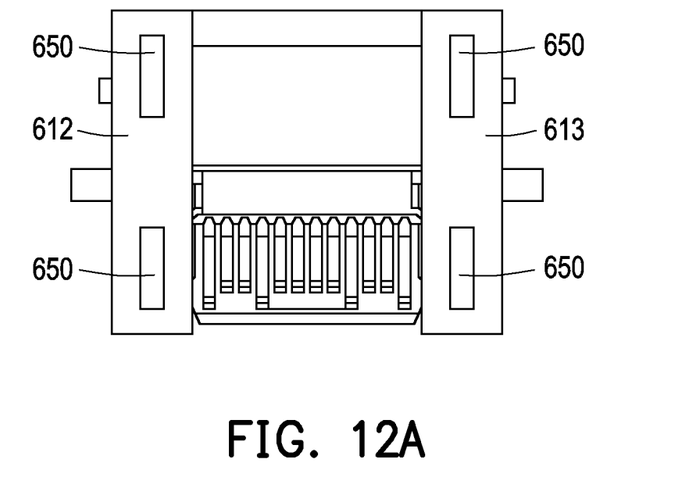
FIG. 12A and FIG. 12B are schematic views of a connection port module according to an eighth embodiment of the disclosure.
Figure 12B:
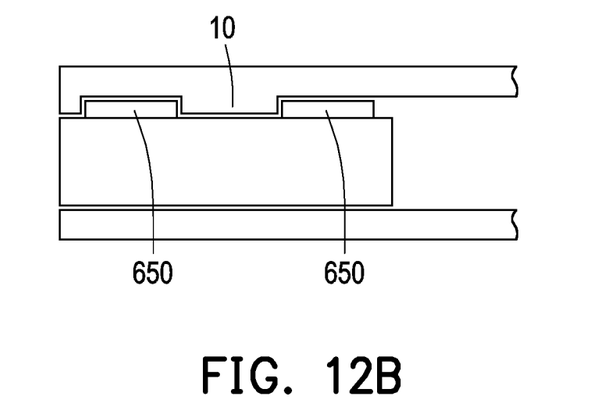
Figure 13:
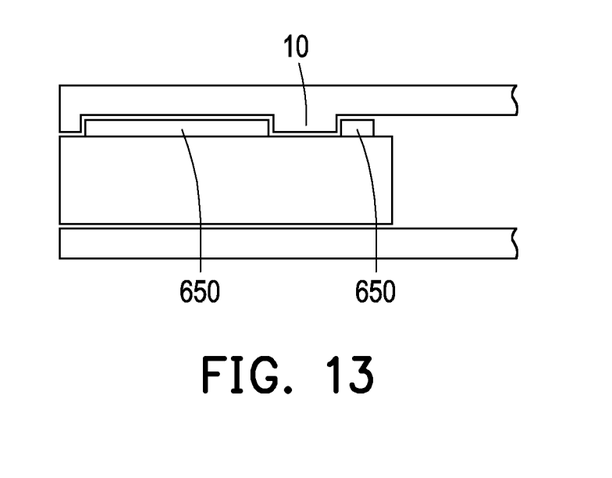
FIG. 13 is a schematic view of a connection port module according to a ninth embodiment of the disclosure.

FIG. 11 is a schematic view of a connection port module according to a seventh embodiment of the disclosure. FIG. 12A and FIG. 12B are schematic views of a connection port module according to an eighth embodiment of the disclosure. FIG. 13 is a schematic view of a connection port module according to a ninth embodiment of the disclosure. With reference to FIG. 11, FIG. 12A, and FIG. 12B, these views show the fixed engagement protrusions 650 of other embodiments. In other words, as shown in FIG. 10A, FIG. 10B, FIG. 11, FIG. 12A, and FIG. 12B, the first holding portion and the second holding portion of the embodiments shown in FIG. 2, FIG. 5, FIG. 7, and FIG. 8 may also be provided with fixed engagement protrusions.

In summary of the foregoing, in the connection port module of the disclosure, the fixed frame includes the main body portion, the first holding portion, and the second holding portion. The first holding portion and the second holding portion are respectively connected to opposite sides of the main body portion. The first holding portion includes the first holding surface. The second holding portion includes the second holding surface. The first holding surface faces the second holding surface. The connection port is disposed in the fixed frame, and is located between the first holding surface and the second holding surface. A connector is adapted to be inserted into the connection port. The first holding surface and the second holding surface are adapted to abut against the connector to fix the connector on the fixed frame. Accordingly, in the connection port module, since the connector can be fixed through the first holding portion and the second holding portion located on the opposite sides of the main body portion, it is possible to not only firmly fix the external connector, but also achieve a relatively small thickness at the same time, helping the thinning of the portable electronic device to which the connection port module is applied.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A connection port module mounted on a portable electronic device, the connection port module comprising:
   a fixed frame comprising:
   a main body portion;
   a first holding portion connected to one side of the main body portion and having a first holding surface; and
   a second holding portion connected to the other side of the main body portion and having a second holding surface, wherein the first holding surface faces the second holding surface; and
   a connection port disposed in the fixed frame and located between the first holding surface and the second holding surface, wherein an external connector is adapted to be inserted from an insertion inlet of the fixed frame to connect with the connection port inside the portable electronic device, and the first holding surface and the second holding surface are adapted to abut against the external connector to fix the external connector on the fixed frame, wherein the fixed frame has no solid structure on one side perpendicular to an inserting direction of the connector, wherein the insertion inlet is opposite to the main body portion, wherein a shortest distance between the first holding surface and the second holding surface is gradually reduced from the insertion inlet toward the main body portion.

2. The connection port module described in claim 1, wherein the fixed frame exposes opposite surfaces of the connection port.

3. The connection port module described in claim 1, wherein the fixed frame includes a notch, the notch is located between the first holding portion and the second holding portion, the connection port is located in the notch, and the notch exposes opposite surfaces of the connection port.

4. The connection port module described in claim 1, wherein the first holding surface and the second holding surface are adapted to abut against four corners of the connector.

5. The connection port module described in claim 1, wherein the connection port is connected to the fixed frame by assembly or the connection port is integrally connected to the fixed frame.

6. The connection port module described in claim 1, wherein the first holding surface and the second holding surface are each a curved surface, and four corners of the external connector are each a curved surface, wherein the four corners of the external connector are adapted to abut against the curved surface of the first holding surface and the curved surface of the second holding surface.

7. The connection port module described in claim 6, wherein when a curvature of the first holding surface and the second holding surface are the same as a curvature of the four corners of the connector, projections of centers of circle of the first holding surface and the second holding surface and projections of corresponding centers of circle of the four corners on a virtual plane are overlapped with each other; when the curvature of the first holding surface and the curvature of the second holding surface are greater or less than the curvatures of the four corners of the connector, the projections of the centers of circle of the first holding surface and the second holding surface and the projections of the corresponding centers of circle of the four corners on the virtual plane are non-overlapped with each other.

8. The connection port module described in claim 1, wherein the first holding surface and the second holding surface each include a concave-convex structure.

9. The connection port module described in claim 1, wherein the first holding surface and the second holding surface each comprise a planar region and two inclined regions, the two inclined regions are located on opposite sides of the planar region, and the two inclined regions of the first holding surface and the two inclined regions of the second holding surface are adapted to abut against four corners of the connector.

10. The connection port module described in claim 1, wherein the first holding surface and the second holding surface each comprise a planar region and two curved regions protruding toward the main body portion, the two curved regions are located on opposite sides of the planar region, and the two curved regions of the first holding surface and the two curved regions of the second holding surface are adapted to abut against four corners of the connector.

11. The connection port module described in claim 1, further comprising:
   a plurality of fixed engagement protrusions respectively disposed on the first holding portion and the second holding portion, and respectively protruding from the first holding portion and the second holding portion.

12. The connection port module described in claim 1, further comprising:
   a plurality of first conductive members connected to the connection port; and
   a plurality of second conductive members respectively disposed on and passing through the first holding portion and the second holding portion, wherein the second conductive members are connected to the first conductive members.

13. The connection port module described in claim 12, wherein the second conductive members disposed on the first holding portion protrude from or are flush with a first outer surface of the first holding portion, and the second conductive members disposed on the second holding portion protrude from or are flush with a second outer surface of the second holding portion.

14. The connection port module described in claim 12, wherein each of the second conductive members includes a front end and a rear end opposite to the front end, the front end disposed on the first holding portion passes through and protrudes from the first holding surface, the front end disposed on the second holding portion passes through and protrudes from the second holding surface, and the rear end disposed on the first holding portion and the rear end disposed on the second holding portion pass through the fixed frame and are connected to the first conductive members.

* * * * *